Patented May 18, 1948

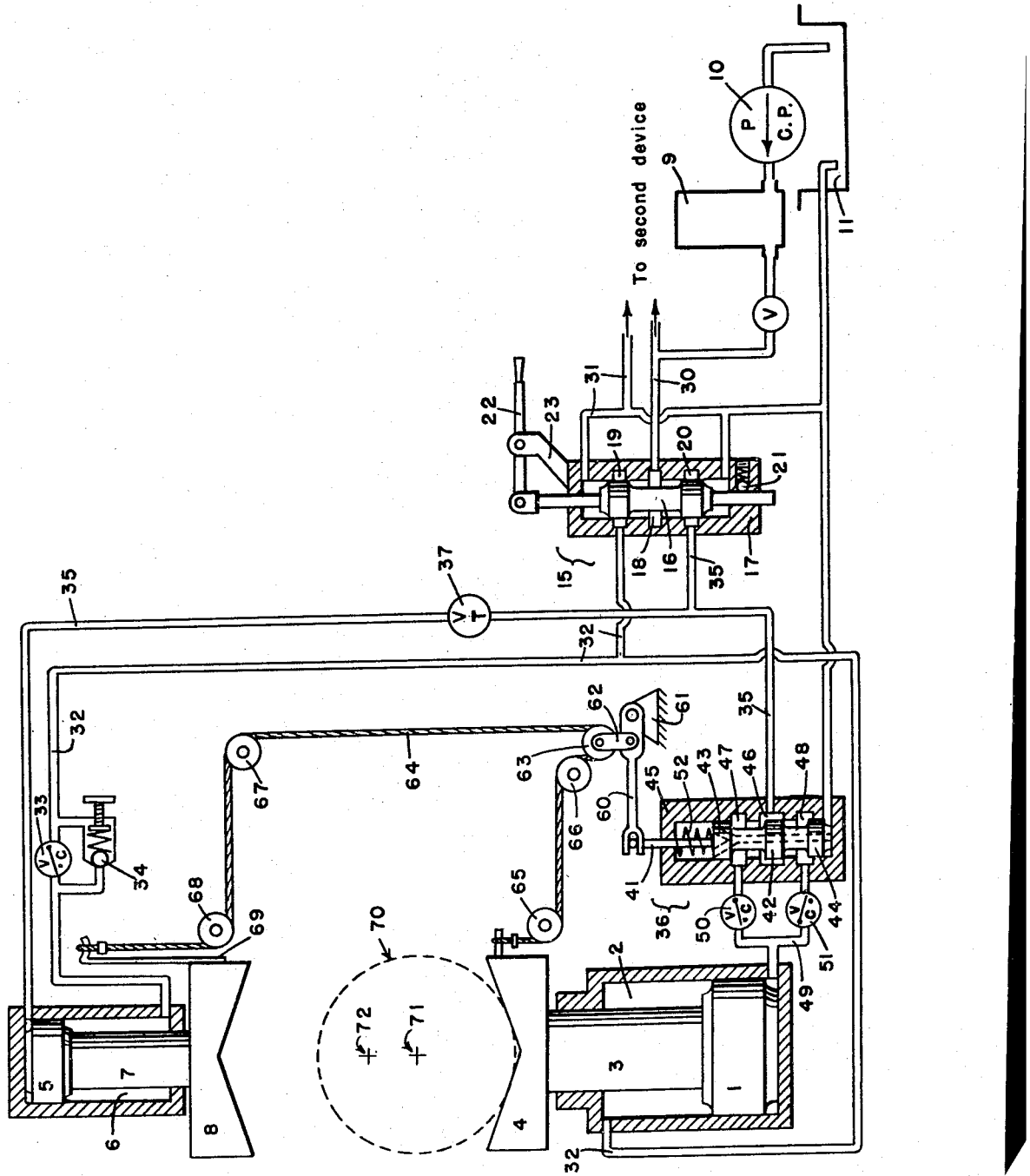

2,441,925

UNITED STATES PATENT OFFICE 2,441,925

CENTERING DEVICE

Ervin C. Wege, Milwaukee, Wis., assignor to The Oilgear Company, Milwaukee, Wis., a corporation of Wisconsin Application November 9, 1944, Serial No. 562,693

8 Claims. (Cl. 60—97)

This invention relates to centering devices and it has as an object to provide an apparatus which is adapted to move an object to such a point that the center thereof will be in a predetermined position regardless of the diameter of the object.

For the purpose of illustration, the invention has been shown in the accompanying drawing as being embodied in a centering device for moving a log to such a position that its center will coincide with the center of a barking machine but it is to be understood that the invention is not limited to apparatus for that purpose.

The centering device chosen for illustration includes two opposed hydraulic motors one of which has a piston 1 fitted in a stationary cylinder 2 and provided with a ram 3 which extends through the upper end of cylinder 2 and has a V-block or gripper 4 fastened to its upper end. The other motor has a piston 5 fitted in a stationary cylinder 6 and provided with a ram 7 which extends through the lower end of cylinder 6 and has a V-block or gripper 8 fastened to its lower end.

Motive liquid for operating the motors is supplied from any suitable source such as an accumulator 9 which is kept charged by a pump 10 preferably of the constant pressure type. Pump 10 draws liquid from a reservoir 11 and discharges it into accumulator 9 until the pressure therein reaches a predetermined maximum and then pump 10 reduces its displacement until it is delivering just enough liquid to maintain that maximum pressure constant. Since such pumps are well known and in extensive use, pump 10 has been shown schematically and further description thereof is deemed unnecessary.

Flow of liquid to and from the hydraulic motors is controlled by a reversing valve 15 which has a valve member 16 fitted in the bore of a valve casing 17 having three annular grooves or ports 18, 19, and 20 formed in the wall thereof. Valve member 16 in its central or neutral position blocks ports 19 and 20 and it may be retained in that position by a detent 21. Valve member 16 may be moved in one direction or the other by any suitable means such as a hand lever 22 pivoted to the stem of valve member 16 and to a stationary bracket 23.

Reversing valve 15 has its port 18 connected by a channel 30 to accumulator 9 and opposite ends of its casing 17 connected to an exhaust channel 31 which discharges into reservoir 11. Channels 30 and 31 may have branches for directing liquid to and from one or more similar centering devices such as a centering device arranged near the end of a barking machine opposite the end near which the device shown is arranged.

When two of the devices are employed for centering a single object such as raising a log to bring the centers of its ends into alignment with the centers of a barking machine, the reversing valves 15 are either arranged close together so that the levers 22 thereon may be operated simultaneously when desired or the reversing valves are operated magnetically and controlled by switches arranged near each other so that the devices may be caused to operate simultaneously or independently.

Port 19 in reversing valve 15 is connected by a branched channel 32 to the upper or gland end of cylinder 2 and to the lower or gland end of cylinder 6. In order to prevent piston 5 and gripper 8 from descending when the device is idle, the upper branch of channel 32 has connected therein a check valve 33 and a resistance valve 34 which open in opposite directions so that liquid may flow freely to the lower end of cylinder 6 but cannot escape therefrom except through resistance valve 34.

Port 20 is connected by a branched channel 35 to the upper or head end of cylinder 6 and to a valve 36 which controls the rate at which liquid flows to and from the lower or head end of cylinder 2. The upper branch of channel 35 has a throttle valve 37 or other choke therein to limit the rate of flow of liquid to and from the upper end of cylinder 6 to thereby limit the speed of piston 5 and gripper 8.

Control valve 36 includes a valve member 41 having three pistons 42, 43 and 44 formed thereon and fitted in the bore of a valve casing 45 which has three annular grooves or ports 46, 47 and 48 formed in the wall of its bore. Piston 42 controls communication between port 46 and ports 47 and 48. Pistons 43 and 44 control communication between ports 47 and 48 and the end portions of the bore in casing 45 respectively. Port 46 has channel 35 connected thereto. Ports 47 and 48 are connected to the lower or head end of cylinder 2 by a branched channel 49 having two check valves 50 and 51 arranged, respectively, in its upper and lower branches to permit liquid to flow freely from port 47 to cylinder 2 and from cylinder 2 to port 48 but to prevent flow in the opposite direction.

Valve member 41 is urged by a spring 52 downward or in a direction to permit free flow from channel 35 through ports 46 and 47, check valve 50 and channel 49 to the lower end of cylinder 2 and it is adapted to be moved upward or in a direction to throttle the flow of liquid to the lower end of cylinder 2 in response to gripper 4 moving faster or through a greater distance than gripper 8 moves. The openings between port 46 and port 47 and between port 46 and port 48 preferably are each large in area and narrow in width so that a slight movement of valve member 41 will cause a considerable variation in the flow through valve 36 and means are preferably provided for causing a considerable movement of valve member 41 in response to a slight variation in the movement of gripper 4 relative to the movement of gripper 8.

As shown, valve member 41 is pivotly connected to one end of a lever 60 which is pivoted to a stationary bracket 61 and carries a pair of links 62 between which a sheave 63 is journaled. Sheave 63 is arranged in the bight of a cable 64 which has one of its ends attached to gripper 4 and its other end attached to gripper 8 so that sheave 63 will remain stationary during movement of grippers 4 and 8 toward and away from each other at the same speed but movement of one gripper through a greater distance than the other gripper will cause sheave 63 to move in one direction or the other and thereby cause valve member 41 to move in one direction or the other. In order that cable 64 may not interfere with the mechanism of the barking machine, sheave 63 is spaced from the paths of the grippers, cable 64 is guided by a plurality of deflector sheaves 65, 66, 67 and 68 and the upper end of cable 64 is connected to gripper 8 by a bar 69 which extends upward therefrom.

Operation

When member 16 of reversing valve 15 is moved downward, port 20 is opened to port 18 and port 19 is opened to exhaust channel 31. Liquid will then flow from accumulator 9 through channel 30 and valve 15 into channel 35. A part of the liquid will flow through the upper branch of channel 35 to the upper end of cylinder 6 and cause piston 5 to move gripper 8 downward and another part of the liquid will flow through the lower branch of channel 35, valve 36, check valve 50 and channel 49 to the lower end of cylinder 2 and cause piston 1 to move gripper 4 upward. Pistons 1 and 5 will eject liquid from cylinders 2 and 6, respectively, through channel 32, valve 15 and channel 31 into reservoir 11. The liquid ejected from cylinder 6 passes through resistance valve 34 which prevents piston 5 and gripper 8 from descending by gravity.

Throttle 37 restricts the flow of liquid to cylinder 6 but liquid can at first flow freely through valve 36 to cylinder 2 and cause piston 1 to momentarily move gripper 4 and the lower end of cable 64 upward faster than piston 5 moves gripper 8 and the upper end of cable 64 downward which will cause cable 64 to raise sheave 63 and thereby move valve member 41 upward. Piston 42 on valve member 41 will reduce the opening between port 46 and port 47 to throttle the flow through valve 36 and thereby reduce the speed of piston 1 until it is moving at exactly the same speed as piston 5. Throttle 37 thus determines the speed at which the device operates.

Since a slight movement of gripper 4 relative to movement of gripper 8 causes a substantial movement of valve 41 and since a slight movement of valve member 41 causes a substantial change in the rate at which liquid is delivered to cylinder 2, the speeds of the two grippers are synchronized almost instantly after starting. Thereafter, the two grippers must move toward each other through identical distances for the reason that, if one gripper tends to move farther than the other gripper, valve 36 will operate to vary the flow of liquid to cylinder 2 and thereby correct any such tendency. Consequently, when an object is moved by one gripper into firm engagement with the other gripper, the center of the object will coincide with the centerline of the device regardless of the size of the object.

For example, if two of the devices are associated with a barking machine, a log is placed upon grippers 4 as indicated in dotted lines at 70 and the devices are operated, the two grippers of each device will approach each other until grippers 8 engage the log at which time the center 71 of the log will coincide with the centerline 72 of the barking machine regardless of the diameter of the log and then the centers of the barking machine may be driven into the log. As soon as the log is supported by the centers of the barking machine, the grippers may be retracted by moving member 16 of reversing valve 15 upward.

With valve member 16 in its upper position, port 19 is open to port 18, so that liquid may flow from accumulator 9 through valve 15 into channel 32, and port 20 is open to channel 31 so that liquid can flow from channel 35 through valve 15 and channel 31 into reservoir 11. Liquid will flow freely through channel 32 and check valve 33 to the lower end of cylinder 6 and raise piston 5 which will expel liquid from the upper end of cylinder 6 through channel 35 and throttle 37 will limit the rate of flow therethrough and thereby limit the speed of piston 5 and gripper 8.

Liquid may flow freely through channel 32 to the upper end of cylinder 2 and cause piston 1 to move downward and to eject liquid from the lower end of cylinder 2 through channel 49, check valve 51 and valve 36 into channel 35. Piston 1 tends to move faster than piston 5, but the instant that gripper 4 moves slightly farther than gripper 8, sheave 63 starts to move downward and permit valve member 41 to move downward so that piston 42 throttles the flow from port 48 to port 46 and thereby reduces the speed of piston 1 to the speed of piston 5. When grippers 4 and 8 are fully retracted, reversing valve member 16 may be returned to its initial position.

The device described herein is susceptible of various modifications and adaptations without departing from the scope of the invention which is hereby claimed as follows:

1. The combination of two separate reciprocating hydraulic motors, a source of motive liquid, means for directing liquid from said source to said motors to effect simultaneous operation thereof, means for limiting the flow to one of said motors to thereby limit the speed thereof, a throttle valve for controlling the flow of liquid to the other motor to thereby control the speed thereof, and means responsive to a variation in the relative movements of said motors for adjusting said valve to vary the flow therethrough and thereby synchronize the movements of said motors.

2. The combination of two separate reciprocating hydraulic motors, a source of motive liquid, means for directing liquid from said source to said motors to effect simultaneous operation thereof, means for limiting the flow to one of said motors to thereby limit the speed thereof, a throttle valve for controlling the flow of liquid to the other motor to thereby control the speed thereof, and means responsive to a variation in the relative movements of said motors for adjusting said valve to vary the flow therethrough and thereby synchronize the movements of said motors, said last mentioned means including multiplying means whereby a slight variation in the relative movements of said motors causes a substantial adjustment of said valve.

3. The combination of a first hydraulic motor for effecting movement in one direction, a second separate hydraulic motor for effecting movement in a different direction, a source of motive liquid, means for directing liquid from said source to said motors to effect simultaneous operation thereof, means for limiting the flow to one of said motors to thereby limit the speed thereof, a throttle valve for controlling the flow of liquid to the other motor to thereby control the speed thereof, a sheave connected to said valve to operate it, a cable extending partly around said sheave, means for connecting one end of said cable to a movable part of one of said motors, and means for connecting the other end of said cable to a movable part of the other motor whereby a variation in movement effected by one motor relative to movement effected by the other motor causes said sheave to adjust said valve to vary the flow of liquid to said other motor and thereby correct such variation and synchronize said movements.

4. The combination of a first hydraulic motor for effecting movement in one direction, a second separate hydraulic motor for effecting movement in a different direction, a source of motive liquid, means for directing liquid from said source to said motors to effect simultaneous operation thereof, means for limiting the flow to one of said motors to thereby limit the speed thereof, a throttle valve for controlling the flow of liquid to the other motor to thereby control the speed thereof, a sheave connected to said valve to operate it, a cable extending partly around said sheave, means for connecting one end of said cable to a movable part of one of said motors, means for connecting the other end of said cable to a movable part of the other motor whereby a variation in movement effected by one motor relative to movement effected by the other motor causes said sheave to adjust said valve to vary the flow of liquid to said other motor and thereby correct such variation and synchronize said movements, and motion multiplying means connected between said sheave and said valve whereby a slight movement of said sheave effects a substantial adjustment of said valve.

5. The combination of two separate reciprocating hydraulic motors, a source of motive liquid, fluid channels connecting corresponding ends of said motors to each other and to said source to form a hydraulic circuit having interchangeable pressure and return sides through which liquid flows to effect simultaneous operation of said motors, flow control means for directing liquid from said source through one or the other side of said circuit and for cutting off flow through both sides of said circuit, means for limiting the flow of liquid to and from one end of one of said motors to thereby limit the speed of that motor, a throttle valve for controlling the flow of liquid to and from the corresponding end of the other motor to thereby control the speed of that motor, and means responsive to a variation in the relative movements of said motors for adjusting said valve to vary the flow therethrough and thereby synchronize the movements of said motors.

6. The combination of two separate reciprocating hydraulic motors, a source of motive liquid, fluid channels connecting corresponding ends of said motors to each other and to said source to form a hydraulic circuit having interchangeable pressure and return sides through which liquid flows to effect simultaneous operation of said motors, flow control means for directing liquid from said source through one or the other side of said circuit and for cutting off flow through both sides of said circuit, means for limiting the flow of liquid to and from one end of one of said motors to thereby limit the speed of that motor, a throttle valve for controlling the flow of liquid to and from the corresponding end of the other motor to thereby control the speed of that motor, and means responsive to a variation in the relative movements of said motors for adjusting said valve to vary the flow therethrough and thereby synchronize the movements of said motors, said last mentioned means including multiplying means whereby a slight variation in the relative movements of said motors causes a substantial adjustment of said valve.

7. The combination with a source of motive liquid of two separate hydraulic motors each including a piston and a cylinder, means for directing liquid from said source to corresponding ends of said cylinders simultaneously to effect advance strokes of said pistons, means for controlling the speed of the first of said motors including a choke for limiting the flow of liquid thereto and a relief valve for resisting the discharge of liquid therefrom, and means for maintaining the speed of the second motor proportional to the speed of said first motor including a throttle valve for controlling the flow of liquid to said second motor and means responsive to a variation in the relative speeds of said motors for adjusting said throttle valve.

8. The combination with a source of motive liquid of two separate hydraulic motors each including a piston and a cylinder, means for directing liquid from said source to corresponding ends of said cylinders simultaneously and to opposite ends of each cylinder alternatively to effect advance and return strokes of said pistons, means for controlling the speed of the first of said motors including a choke for limiting the flow of liquid to and from one end of its cylinder and a relief valve for resisting the discharge of liquid from the other end of its cylinder, and means for maintaining the speed of the second motor proportional to the speed of said first motor including a throttle valve for controlling the flow of liquid to and from one end of the cylinder of said second motor and means responsive to a variation in the relative speeds of said motors for adjusting said throttle valve.

ERVIN C. WEGE.

REFERENCES CITED

The following references are of record in the file of this patent:

UNITED STATES PATENTS

| Number | Name | Date |
|---|---|---|
| 69,577 | O'Connor | Oct. 8, 1867 |
| 198,327 | Winn | Dec. 18, 1877 |
| 726,425 | Harmet | Apr. 28, 1903 |
| 1,350,782 | Catucci | Aug. 24, 1920 |
| 2,343,167 | Bench | Feb. 29, 1944 |
| 2,399,824 | Pressman | May 7, 1946 |

FOREIGN PATENTS

| Number | Country | Date |
|---|---|---|
| 369,364 | Great Britain | Mar. 24, 1932 |